United States Patent
Bentley et al.

[15] 3,684,098
[45] Aug. 15, 1972

[54] LIQUID FILTER FOR REMOVING FINE CLAY PARTICLES AND THE LIKE

[72] Inventors: George I. Bentley, Aptos; Jonas L. Roe, Ben Lomond, both of Calif.

[73] Assignee: Santa Cruz Aggregates Co., Santa Cruz, Calif.

[22] Filed: Aug. 7, 1970

[21] Appl. No.: 62,105

[52] U.S. Cl. .................................210/374, 210/377
[51] Int. Cl. ...................................................B01d 33/36
[58] Field of Search...................210/75, 78, 374, 377

[56] References Cited

UNITED STATES PATENTS

| | | |
|---|---|---|
| 576,412 | 2/1897 | Oliver...................210/374 |
| 3,494,472 | 2/1970 | Quetsch..................210/374 |
| 1,589,097 | 6/1926 | Behr....................210/374 X |
| 1,989,728 | 2/1935 | Zorn et al.................210/75 |

*Primary Examiner*—Samih N. Zaharna
*Attorney*—Owen, Wickersham & Erickson

[57] ABSTRACT

A device for purifying water from very fine particles approaching colloidal size while obtaining a rather dry filter cake. A perforate supporting drum is concentric within an imperforate cylindrical housing wall and radially inset therefrom and is lined with nylon filter cloth. A screw and a cylinder barrier are mounted concentrically within the drum and the edge of the screw is spaced at a predetermined distance between one-sixteenth and five-eighths inch from the filter cloth The drum and filter cloth are rotated together at a speed imparting centrifugal force, and the screw is rotated at a different speed approximating that of the drum. An impeller vane pump introduces slurry to the upper end of the screw outside the barrier. The fine particles are moved by centrifugal force against the filter cloth and build up a filter bed thereon, so that water is filtered through it and passes through the filter cloth and drum into the space outside the drum.

2 Claims, 6 Drawing Figures

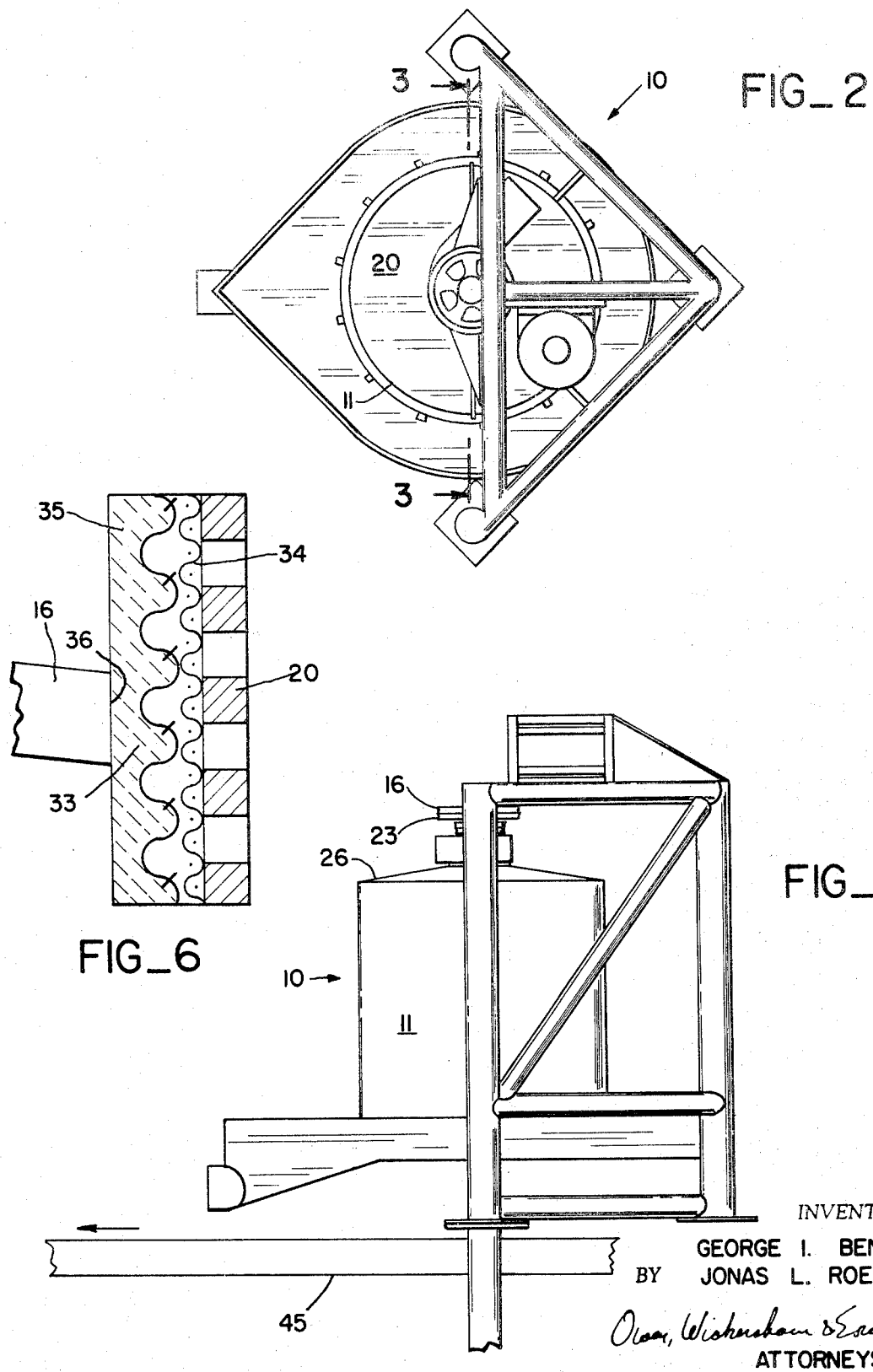

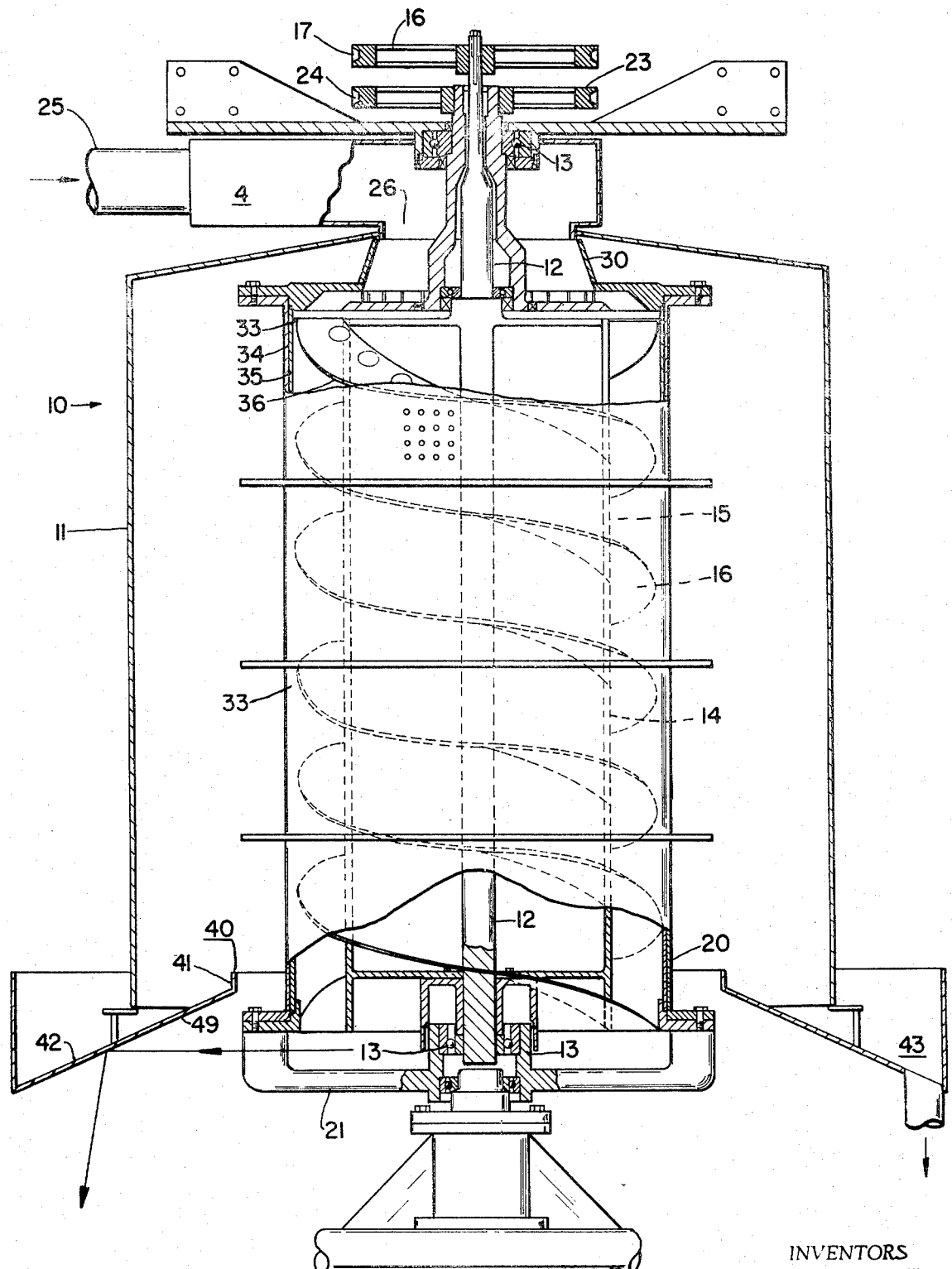
FIG_3

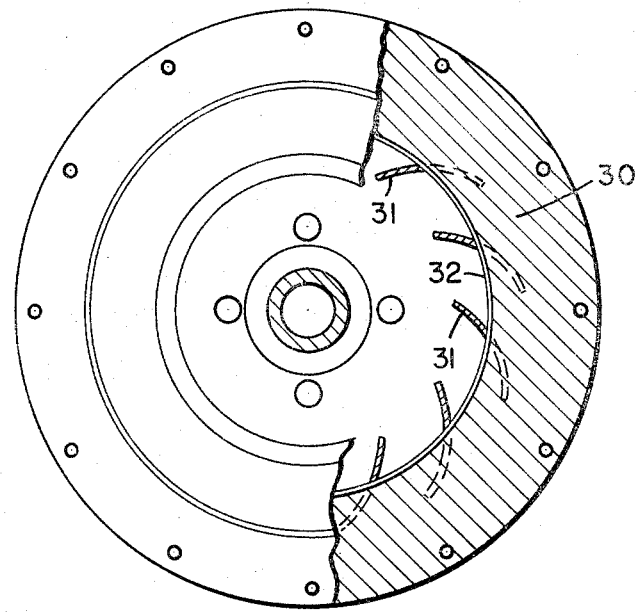
FIG_5
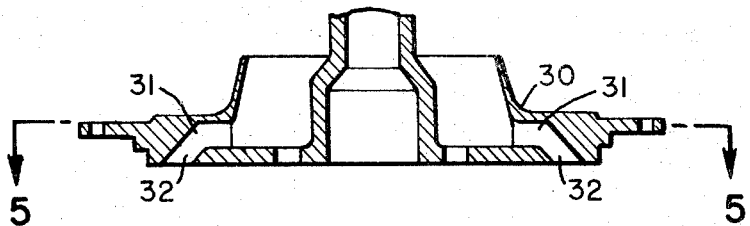
FIG_4

LIQUID FILTER FOR REMOVING FINE CLAY PARTICLES AND THE LIKE

BACKGROUND OF THE INVENTION

This invention relates to a device and a method for purifying water from very fine particles approaching colloidal size and for obtaining a rather dry filter cake, a residue substantially freed from water.

As concern about pollution mounts, many businesses are confronted with situations that have not previously existed. Waste water was formerly dumped in a manner which admittedly resulted in pollution, but no one seemed to care. Now that people do care, governments, including sanitary districts, have been much more demanding. It becomes essential, then, in industries which utilize water, to be able to purify the water and reuse it or at least to be able to release it into a stream without causing objectionable pollution. It also becomes important that the residue removed from the water be obtained in a rather dry form so that it can be disposed of in minimum space.

For example, the sand-and-gravel or aggregates industry must usually purify its sand and gravel by washing out the fine clay particles that would be contaminants when the sand or gravel is used in concrete, as well as for many other uses. Natural deposits quite often have high sand or gravel content mixed quite thoroughly with a smaller amount of clay, most of which comprises very fine particles approaching colloidal size. Water used to wash such material cannot be dumped into streams or sewer systems without polluting them. Disposal, therefore, of this water has been a difficult matter.

SUMMARY OF THE INVENTION

The invention makes it possible to separate the water from the fine solids to give, on the one hand, a compact rather dry solids residue and, on the other hand, clear water, free from milkiness and from contaminating particles. The water is capable of reuse in washing aggregate or for clean disposal.

The invention incorporates a centrifugal type of filter in which a moving screw carries the slurry downwardly and eventually carries out a rather dry, fine solid, while the water passes through a filter medium carried by a perforate supporting drum.

While some similar devices are known in the art, the present invention has several very important differences.

For one thing, the slurry is introduced into the filter through an impeller type of pump, which distributes the solids and the water feed, causing an even flow of material that is well distributed to the inner periphery of the cylindrical filter medium.

Another important feature is that the invention provides a specific clearance, a definite space, between the inner periphery of the cylindrical filter medium and the outer extremity of the helical vanes of the movable screw. This clearance is carefully maintained in relation to the relative speeds of the screw and screen and to their absolute speeds and to the slurry wetness, all to enable the fine solids to build up and themselves autogenously serve as a filter medium on the inner face of the basic filter medium. In other words, the clay fines themselves are used to filter clay fines from the water, yet the layer is kept thin enough so that the water can pass through at a desired rate and thick enough to give the desired additional filtering achieved by the fine particles themselves.

Another important feature of the invention is the provision of openings through the top of the housing and through the helical blades to prevent the development of a vacuum or vortex at the inner periphery of the screw blade. Centrifugal action tends, of course, to buildup such a vacuum, but the invention provides the necessary centrifugal force without causing the undesirable action that would be caused by substantially lower pressure toward the center.

Still another feature of the invention is the use at its lower end of an inclined wall which separates the purified water from the area where the solids are thrown off by the lower end of the helical screw. This helps both in the drainage of the water away from the filter medium itself and also in the deflection of the solids, so that they are kept within a reasonable area and can fall upon a moving conveyor belt or other suitable device.

BRIEF DESCRIPTION OF THE DRAWINGS

In the drawings:

FIG. 1 is a view in side elevation of a water purification device embodying the principles of the invention.

FIG. 2 is a top plan view thereof.

FIG. 3 is an enlarged view in elevation and in section taken along the line 3—3 in FIG. 2.

FIG. 4 is a view taken generally along the line 4—4 in FIG. 3.

FIG. 5 is a view in section taken along the line 5—5 in FIG. 4.

FIG. 6 is an enlarged, somewhat diagrammatic fragmentary view of the filter bed of fine material buildup on the drum-supported filter cloth by the clearance between the filter cloth and the screw.

DESCRIPTION OF A PREFERRED EMBODIMENT

The water purifier 10 of this invention includes a stationary cylindrical shroud or housing 11, within which and concentric therewith is a center support shaft 12. The center support shaft 12 carries, on suitable bearings 13, a rotating helicoid 14 comprising an inner drum 15 with helical blades 16, which is rotated through a sheave 16 by a drive belt 17. Outside this is a perforate cylindrical drum 20 which is secured to a support member 21 on the shaft 12 and is rotated at a somewhat different speed, preferably somewhat slower than the rotating helicoid 14 or else somewhat faster, but at nearly the same speed. We prefer to rotate it somewhat faster. Its shaft is provided with a suitable sheave 23 which is also driven by a drive belt 24. They may be driven from the same power source, with the sheaves 16 and 23 being of different size to obtain the desired differential rotational speed.

An inlet 25 at the upper end 26 receives the slurry, which has a high water content and which contains many very fine particles approaching colloidal size. Larger particles have usually been screened out because they are easy to filter out with a screw. The slurry enters the device at its upper end 26 through an impeller pump 30 (FIGS. 4 and 5) having a plurality of blades 31 and chambers 32. It is important that the material enter through such an impeller type of pump 30 to get a good distribution with an even flow of material well distributed toward the inner periphery of the cylindrical drum 20. A direct vertical entry is quite undesirable.

The helical screw 16 may have any desirable pitch and width, the one important thing being the clearance space 33 between it and a filter medium 34 which is supported on the inner surface of the perforate drum 20. This filter medium 34 may be a nylon cloth having the desired pore openings. The cloth 34 itself is not very efficient at filtering such fine particles, but if the fine particles are allowed to build up on it to just a little depth, it is thenceforth possible to have those fine particles 35 do most of the filtering, with the filter cloth 34 itself having the main function of holding this fine material in place, just as the perforate drum 20 has the function of holding the filter cloth 34 in place.

We have found that for this fine clay sort of slurry, where the water content of the slurry is approximately 90 percent, that a ⅛-inch clearance between the filter cloth 34 and the edge 36 of the helical blade 16 is a very satisfactory figure. The thickness might be somewhat thinner if one could be sure to rely upon the accurate tolerance of the parts, but one has to be careful that the helical blades 16 do not scrape the filter cloth 34 or come too close to it, so that while one-eighth inch is desirable, a thickness of perhaps one-sixteenth of an inch would be just as good if one could be assured that that would not be disrupted by getting actually nearer due to tolerances in this rather large device.

We have found that when the clearance was enlarged to about five-eighths of an inch, the filtering was relatively slow, too slow for the best results, and that the optimum results seemed to be obtained at about one-eighth of an inch, though it can be somewhat thinner and somewhat thicker without making a great deal of difference. The amount of input, the pitch of threads, and so on, all are important in determining the actual most efficient clearance.

We have used a housing 4 feet in diameter and 4 feet high, 25 horsepower motor of about 1,800 rpm with a 7.8 sheave to drive the screw 16 at 877 rpm through a 2TC 160 sheave and the drum 20 at 1,170 rpm through a 2TC 120 sheave. In this instance the drum 20 was about 25½ inches in diameter and was perforated by ⅜-inch circular openings. The material was three-sixteenths inch thick and 7/16-inch round holes. The drum 20 was nearly 50 inches tall. The helix 16 had a pitch of three turns per drum length and a pitch center of 16 inches and an outer diameter of 24¾ inches and the interior drum a diameter of 18 inches. The peripheral speed of the drum 20 was about 7,500 feet per minute, and the peripheral speed of the outer periphery of the screw was about 5,500 feet per minute. The blade 16 is perforated by a series of 1-inch openings to prevent the buildup of pressure on the inner edge, and at the top of a closure member is provided with a series of 1½-inch holes for release of this vacuum.

At the bottom of the device the drum 20 is closed off by a radial plate 40 which leads by a step 41 to an inclined plate 42 going down at about a 20° or 30° angle. This inclined plate 42 carries the water down to a bottom portion 43, whence it is drained away. At the same time, the outer surface 44 of this plate 42 relative to the water chamber at the inner surface, geometrically speaking, is used as a deflector with the dry material emitting from the bottom of the helical screw 16 being thrown out against it and falling down then to a suitable collector 45 such as a conveyor belt.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A device for purifying water from a slurry largely made up of very fine particles approaching colloidal size while obtaining a rather dry filter cake, including in combination:

an imperforate cylindrical housing wall, a perforate supporting drum concentric with said wall and radially inset therefrom to provide a space between them, filter cloth lining the interior surface of said drum and supported thereby, means for rotating said drum and filter cloth together at a speed imparting centrifugal force, an imperforate cylinder mounted concentrically within and spaced from said drum, a helical screw supported by said cylinder and having its outer edge spaced at a predetermined distance between one-sixteenth and five-eighths inch from said filter cloth, means for rotating said screw at a speed different from but approximating that of said drum, impeller pump means having a plurality of vanes for introducing said slurry to the upper end of said screw, whereby said fine particles are moved by centrifugal force against said filter cloth and build up a filter bed thereon of a thickness determined by the clearance between said screw and said filter cloth, so that water is filtered with the aid of said centrifugal force through said filter bed of fine particles and passes through said filter cloth and drum into the space outside said drum and within said imperforate housing wall, fine particles in excess of said filter bed being carried down said screw, means for conducting the filtered water away from said space, means for removing the relatively dry filter cake of fine particles from the lower end of said screw, said screw being provided with openings therethrough adjacent to and outside of said cylinder, and opening means generally aligned radially with said screw openings above the upper end of said screw to relieve suction and vacuum forces on the inner periphery of said screw.

2. A device for purifying water from a slurry of very fine clay particles approaching colloidal size while obtaining a rather dry filter cake, including in combination:

a stationary imperforate cylindrical housing wall, a rotatable perforate supporting metal drum concentric with said wall and radially inset therefrom to provide a space between them, a lining of nylon filter cloth supported on the interior surface of said drum, means for rotating said drum and filter cloth together at a peripheral speed greater than a mile per minute, thereby imparting centrifugal force, an imperforate cylinder rotatably mounted concentrically within said drum and spaced therefrom, a helical screw supported on the outer surface of said cylinder and spaced at a predetermined distance between one-sixteenth and five-eighths inch from said filter cloth, means for rotating said cylinder and screw at a speed about 20 percent slower than that of said drum, impeller pump means supported at the upper end of said cylinder and having a plurality of vanes for introducing a slurry to the upper end of said screw, said slurry being moved by centrifugal force against said filter cloth to build up a filter bed of fine particles thereon of a thickness determined by the clearance between said screw and said filter cloth, said cylindrical force forcing the water to be filtered through said filter bed of fine particles and to pass through said filter cloth and drum into the space outside said drum and within said imperforate housing wall, excess fine particles being carried down said screw and flung out relatively dry at the lower end thereof, a stationary basin for collecting the filtered water, means for conducting the filtered water away from said basin, means for deflecting the dry particles flung out from the lower end of said screw, means for collecting the deflected dry particles, said screw being provided with openings therethrough adjacent to and outside of said cylindrical barrier, and opening means above the upper end of said screw generally aligned radially therewith to relieve suction and vacuum forces on the inner periphery of said screw.

* * * * *